US012103425B2

(12) United States Patent
Yang

(10) Patent No.: US 12,103,425 B2
(45) Date of Patent: Oct. 1, 2024

(54) AUTOMATIC BATTERY REPLACEMENT APPARATUS, MOVING PLATFORM, AND RECHARGEABLE BATTERY

(71) Applicant: ALi Corporation, Hsinchu (TW)

(72) Inventor: Ming-Yuan Yang, Taipei (TW)

(73) Assignee: ALi Corporation, Hsinchu (TW)

( * ) Notice: Subject to any disclaimer, the term of this patent is extended or adjusted under 35 U.S.C. 154(b) by 580 days.

(21) Appl. No.: 17/523,883

(22) Filed: Nov. 10, 2021

(65) Prior Publication Data

US 2022/0176844 A1    Jun. 9, 2022

(30) Foreign Application Priority Data

Dec. 4, 2020    (CN) .......................... 202011413950.9

(51) Int. Cl.
 *B60L 53/80*    (2019.01)
 *B65G 67/02*    (2006.01)
 (Continued)

(52) U.S. Cl.
 CPC .............. *B60L 53/80* (2019.02); *B65G 67/02* (2013.01); *H01M 10/44* (2013.01);
 (Continued)

(58) Field of Classification Search
 CPC ......... H01M 2220/20; H01M 2220/30; H01M 10/44; H01M 10/46; H01M 50/207; H01M 50/262; B60L 53/80; B60L 53/53; B60L 53/36; B60L 53/66; B60L 53/51; B60L 53/30; B60L 53/34; B60L 53/305; B60L 53/00; B60L 50/66; B60L 50/64; B60L 2200/40; B65G 67/02; H02J 7/0013; H02J 7/0045; H02J 7/0042; H02J 7/0044; H02J 2310/48; H02J 2310/22; A47L 9/2884; A47L 9/2873; A47L 2201/02;
 (Continued)

(56) References Cited

U.S. PATENT DOCUMENTS

| 2013/0009592 A1* | 1/2013 | Larsen | H02J 7/0045 320/107 |
| 2018/0312069 A1* | 11/2018 | McClymond | B64C 25/52 |
| 2022/0158466 A1* | 5/2022 | Choi | H02J 7/0013 |

FOREIGN PATENT DOCUMENTS

| CN | 205396046 U | 7/2016 |
| CN | 106025403 A | 10/2016 |

* cited by examiner

*Primary Examiner* — Glenn F Myers
(74) *Attorney, Agent, or Firm* — Li & Cai Intellectual Property Office

(57) ABSTRACT

An automatic battery replacement apparatus, a moving platform, and a rechargeable battery are provided. The moving platform includes a movable carrier and the rechargeable battery assembled in the movable carrier. The movable carrier includes a carrying body and a moving component that is assembled to the carrying body. The carrying body has a power supply slot recessed in an outer surface thereof, and an inner lateral wall of the power supply slot is in a shape of an arc having a central angle that is less than or equal to 180 degrees. The moving component is configured to move on a working surface. The rechargeable battery has a matching structure configured to be engaged with a driving gear. The rechargeable battery is configured to be rotated along the inner lateral wall of the power supply slot by having the matching structure engaged with the driving gear.

20 Claims, 15 Drawing Sheets

(51) Int. Cl.
*H01M 10/44* (2006.01)
*H02J 7/00* (2006.01)

(52) U.S. Cl.
CPC .......... *H02J 7/0013* (2013.01); *H02J 7/0045* (2013.01); *H01M 2220/30* (2013.01)

(58) Field of Classification Search
CPC .......... B25J 19/005; B64C 25/52; B64F 1/36; B64U 50/39; B64U 50/37; B64U 80/26
See application file for complete search history.

AUTOMATIC BATTERY REPLACEMENT APPARATUS, MOVING PLATFORM, AND RECHARGEABLE BATTERY

CROSS-REFERENCE TO RELATED PATENT APPLICATION

This application claims the benefit of priority to China Patent Application No. 202011413950.9, filed on Dec. 4, 2020 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a battery replacement mechanism, and more particularly to an automatic battery replacement apparatus, a moving platform, and a rechargeable battery.

BACKGROUND OF THE DISCLOSURE

A conventional moving platform (e.g., a robot vacuum) has a rechargeable battery arranged therein. When the electrical power of the rechargeable battery is low and close to a charging threshold, the conventional moving platform can move toward a charging station for charging the rechargeable battery by the charging station. However, a charging mechanism of the conventional moving platform would stop the operation of the conventional moving platform, so that the operation efficiency of the conventional moving platform is reduced.

SUMMARY OF THE DISCLOSURE

In response to the above-referenced technical inadequacy, the present disclosure provides an automatic battery replacement apparatus, a moving platform, and a rechargeable battery to effectively improve on the issues associated with conventional moving platforms.

In one aspect, the present disclosure provides an automatic battery replacement apparatus, which includes a movable carrier, a charging station, and a battery replacement module. The movable carrier includes a carrying body and a moving component. The carrying body has a power supply slot recessed in an outer surface thereof. An inner lateral wall of the power supply slot is in a shape of an arc having a central angle that is less than or equal to 180 degrees. The moving component is assembled to the carrying body and is configured to move on a working surface. The charging station is configured to be located at a predetermined position. The charging station has a charging slot recessed in an outer surface thereof, and an inner lateral wall of the charging slot is in a shape of an arc having a central angle that is less than or equal to 180 degrees. The battery replacement module includes a driving gear and two rechargeable batteries. The driving gear is assembled to at least one of the movable carrier and the charging station, and is configured to be driven by electricity supplied from the charging station. Each of the two rechargeable batteries has a matching structure that is configured to be engaged with the driving gear. One of the two rechargeable batteries is assembled in the power supply slot for supplying electricity to the movable carrier, and another one of the two rechargeable batteries is assembled in the charging slot. The movable carrier and the rechargeable battery assembled therein are jointly defined as a moving platform. The moving platform is configured to be in a movement operation mode where the moving platform is capable of motion relative to the charging station, or a stationary battery replacement mode where the moving platform is stationary relative to the charging station. When the moving platform is in the stillness and battery replacement mode, a center of circle of the inner lateral wall of the power supply slot is overlapped with a center of circle of the inner lateral wall of the charging slot and defines a rotation axis, and the driving gear is engaged with the matching structure of at least one of the two rechargeable batteries so as to rotate the rechargeable batteries along the rotation axis until positions of the two rechargeable batteries are interchanged with each other.

In another aspect, the present disclosure provides a moving platform, which includes a movable carrier and a rechargeable battery. The movable carrier includes a carrying body and a moving component. The carrying body has a power supply slot recessed in an outer surface thereof. An inner lateral wall of the power supply slot is in a shape of an arc having a central angle that is less than or equal to 180 degrees. The moving component is assembled to the carrying body and is configured to move on a working surface. The rechargeable battery is assembled in the power supply slot for supplying electricity to the movable carrier. The rechargeable battery has a matching structure configured to be engaged with a driving gear. The rechargeable battery is configured to be rotated along the inner lateral wall of the power supply slot by having the matching structure engaged with the driving gear.

In yet another aspect, the present disclosure provides a rechargeable battery for being assembled in a movable carrier or a charging station. The rechargeable battery includes an outer lateral side and an engaging slot. The outer lateral side is in a shape of an arc having a central angle that is less than or equal to 180 degrees. The engaging slot is formed on a center of circle of the outer lateral side. The engaging slot is configured to engage with part of a plurality of teeth of the driving gear. The rechargeable battery is configured to be rotated along a circular rotation path by using the engaging slot to be engaged with the driving gear.

Therefore, the automatic battery replacement apparatus of the present disclosure is provided for automatic replacing the rechargeable battery through the structural designs of the rechargeable battery and other components (e.g., the driving gear, the movable carrier, and/or the charging station).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings, wherein.

DETAILED DESCRIPTION OF THE EXEMPLARY EMBODIMENTS

Figure 1:
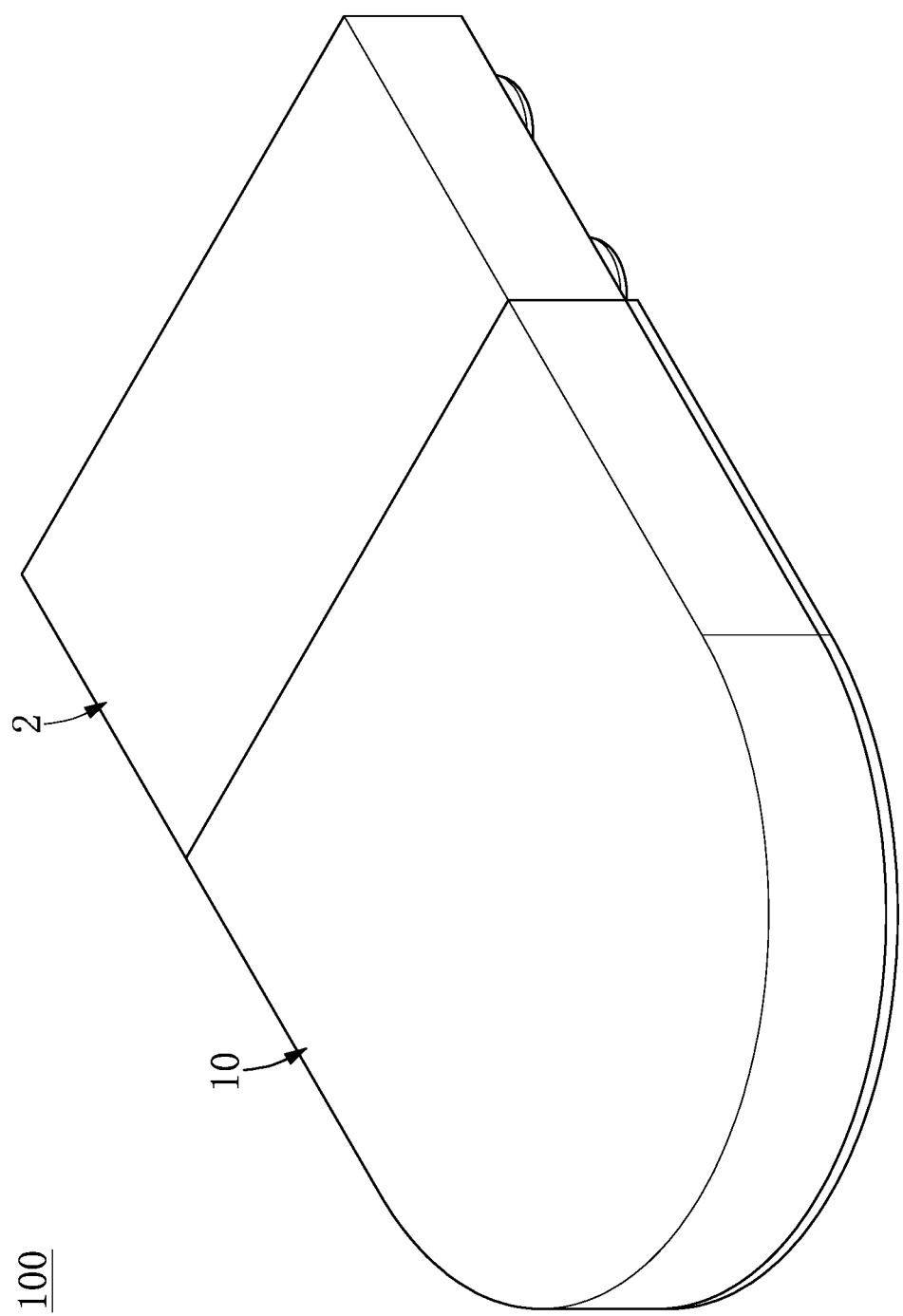
FIG. 1 is a perspective view of an automatic battery replacement apparatus according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
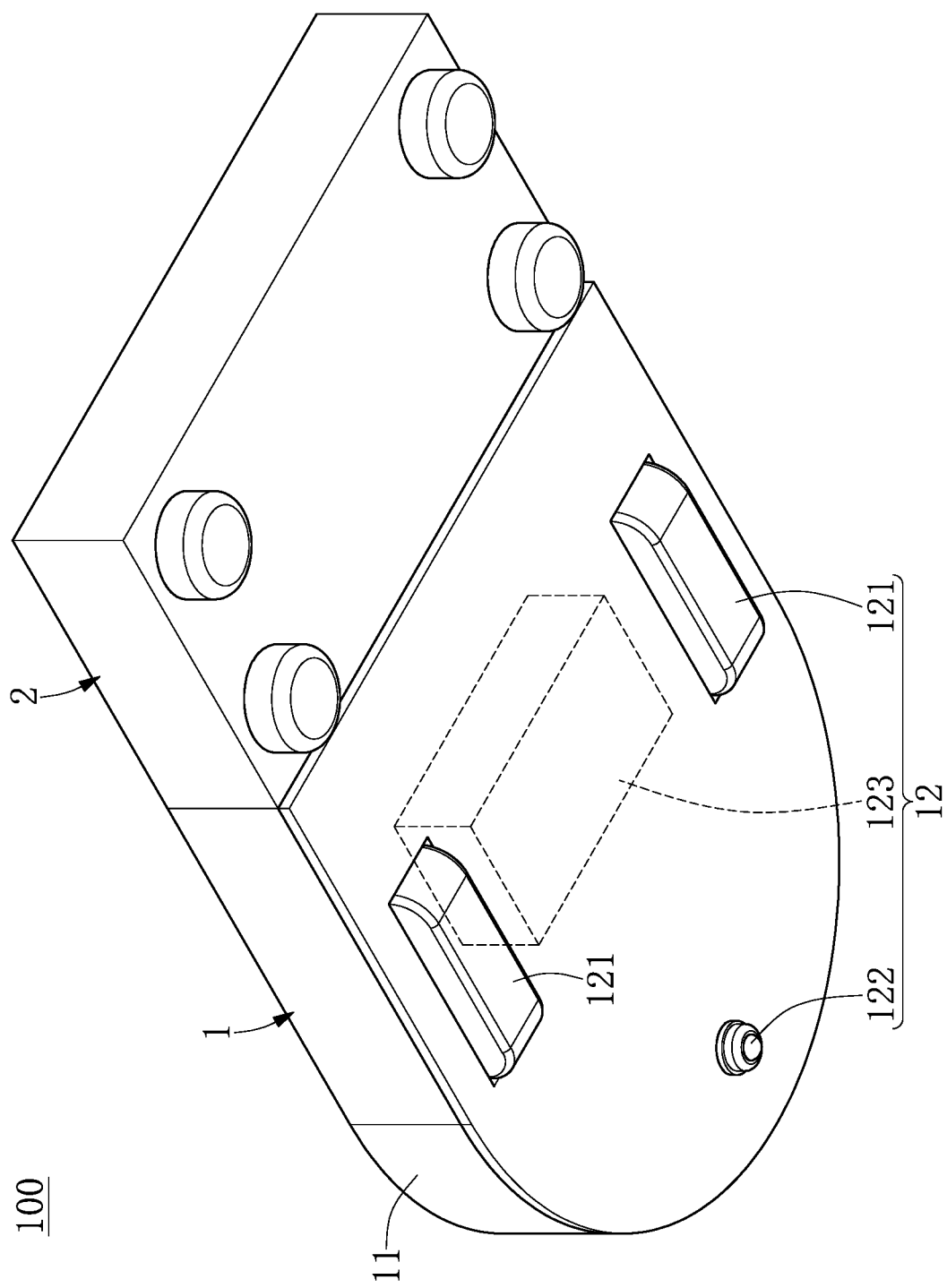
FIG. 2 is a perspective view showing the automatic battery replacement apparatus of FIG. 1 from another angle of view.
Figure 3:
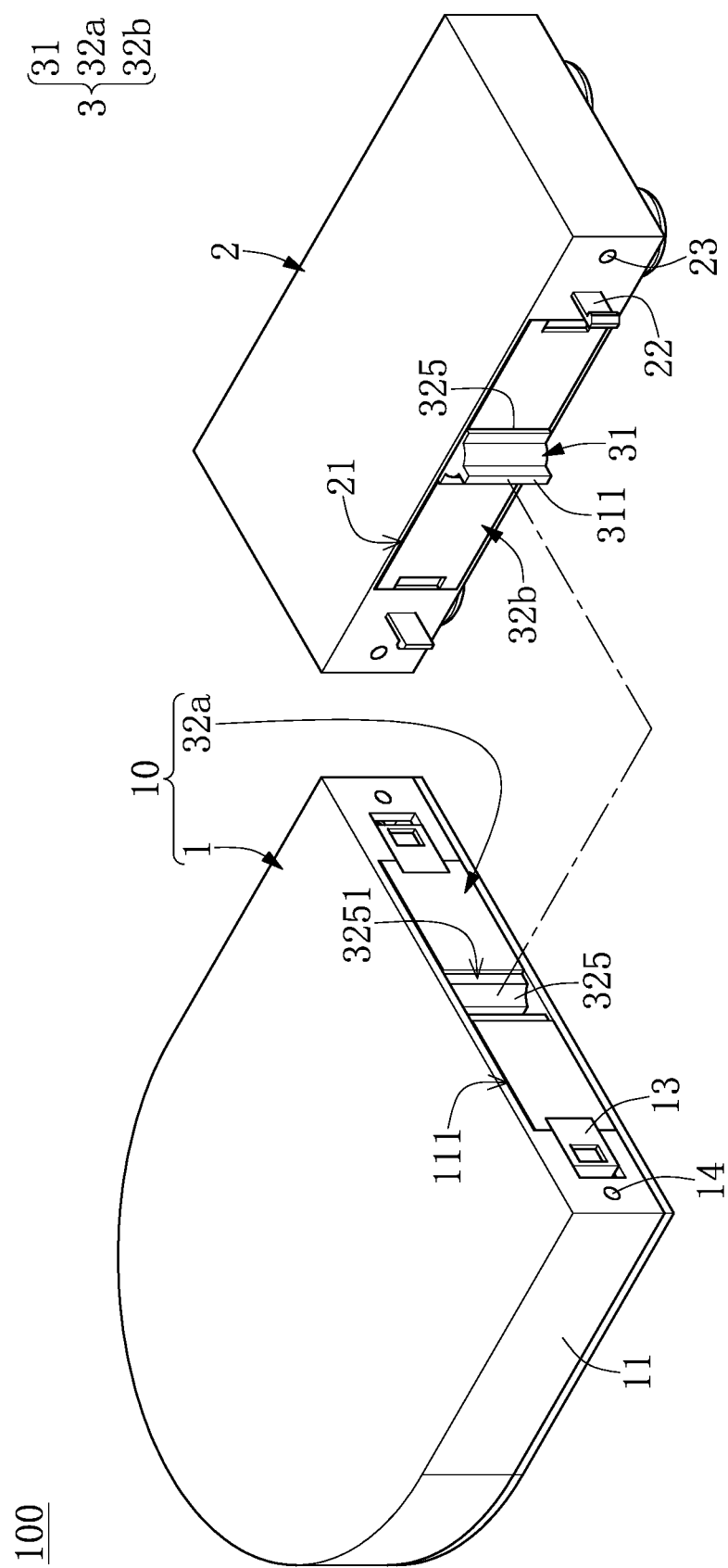
FIG. 3 is an exploded view of FIG. 1.

Referring to FIG. 1 to FIG. 11, a first embodiment of the present disclosure provides an automatic battery replacement apparatus 100. As shown in FIG. 1 to FIG. 3, the automatic battery replacement apparatus 100 includes a movable carrier 1, a charging station 2, and a battery replacement module 3 that is assembled to the movable carrier 1 and the charging station 2. The battery replacement module 3 includes a driving gear 31 and two rechargeable batteries 32a, 32b. The two rechargeable batteries 32a, 32b are respectively assembled to the movable carrier 1 and the charging station 2, and positions of the two rechargeable batteries 32a, 32b can be interchanged with each other through the driving gear 31.

It should be noted that the movable carrier 1 in the present embodiment is described in cooperation with the charging station 2 and the battery replacement module 3, but the present disclosure is not limited thereto. For example, the movable carrier 1 and the rechargeable battery 32a assembled therein can be jointly defined as a moving platform 10 that can be independently used (e.g., sold) or can be used in cooperation with other components (e.g., a movable charging station). Moreover, any one of the two rechargeable batteries 32a, 32b can be independently used (e.g., sold) or can be used in cooperation with other components.

In order to clearly describe the automatic battery replacement apparatus 100, the following description describes the battery replacement module 3, and then describes the movable carrier 1, the charging station 2, and the connection relationship of each component of the automatic battery replacement apparatus 100.

Figure 4:
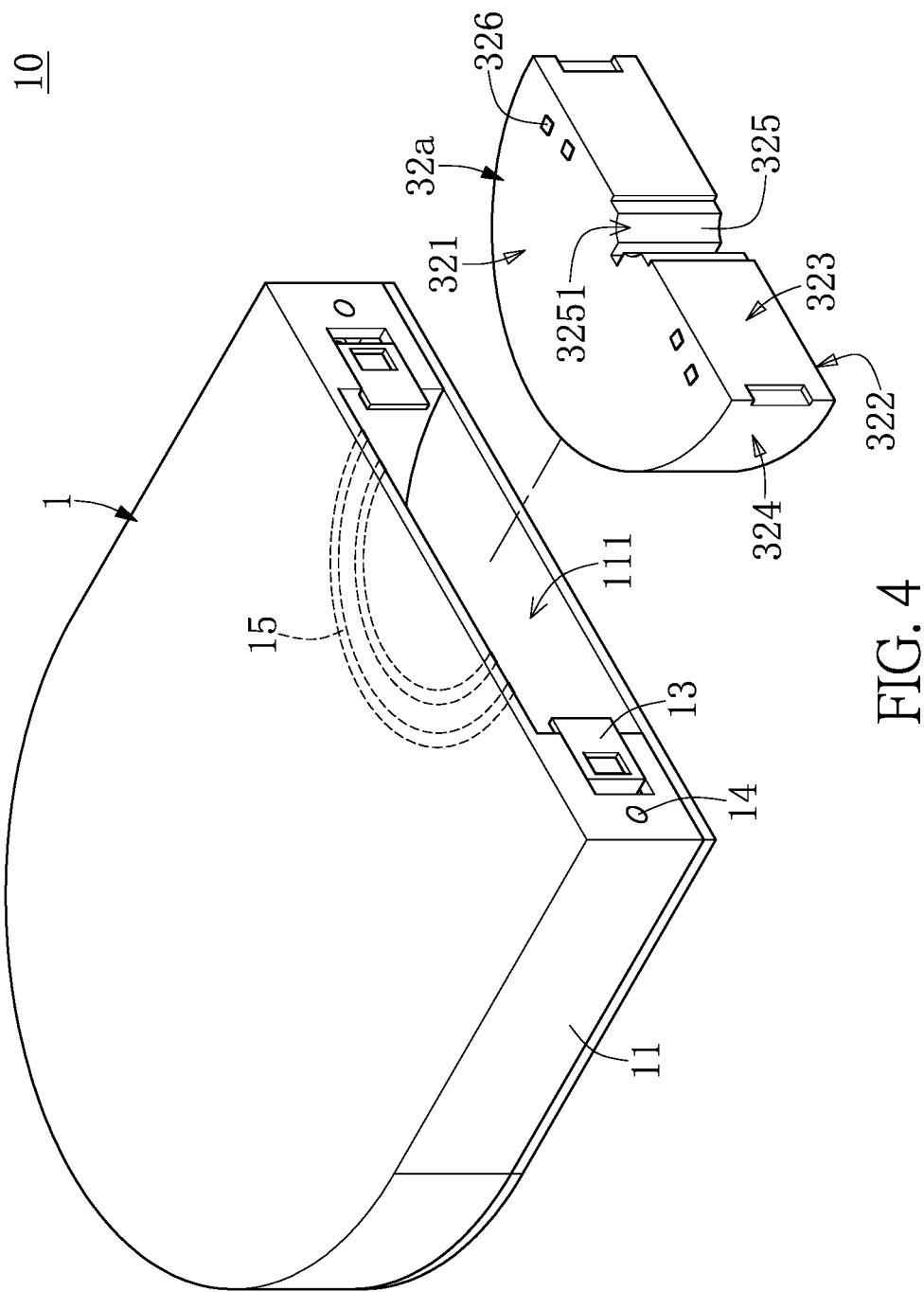
FIG. 4 is an exploded view showing a moving platform of FIG. 3.
Figure 5:
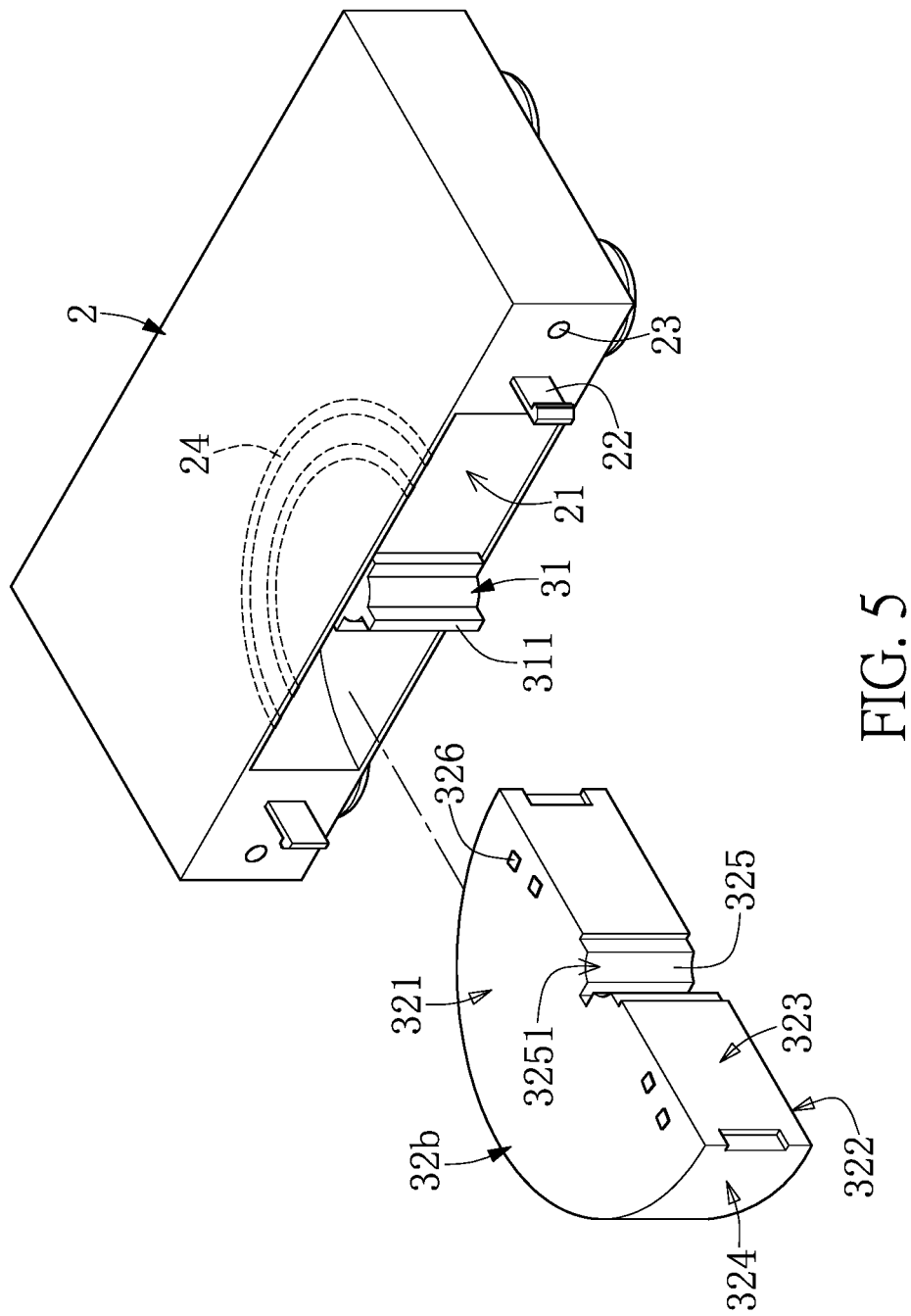
FIG. 5 is an exploded view showing a charging station and a rechargeable battery of the charging station of FIG. 3.
Figure 6:
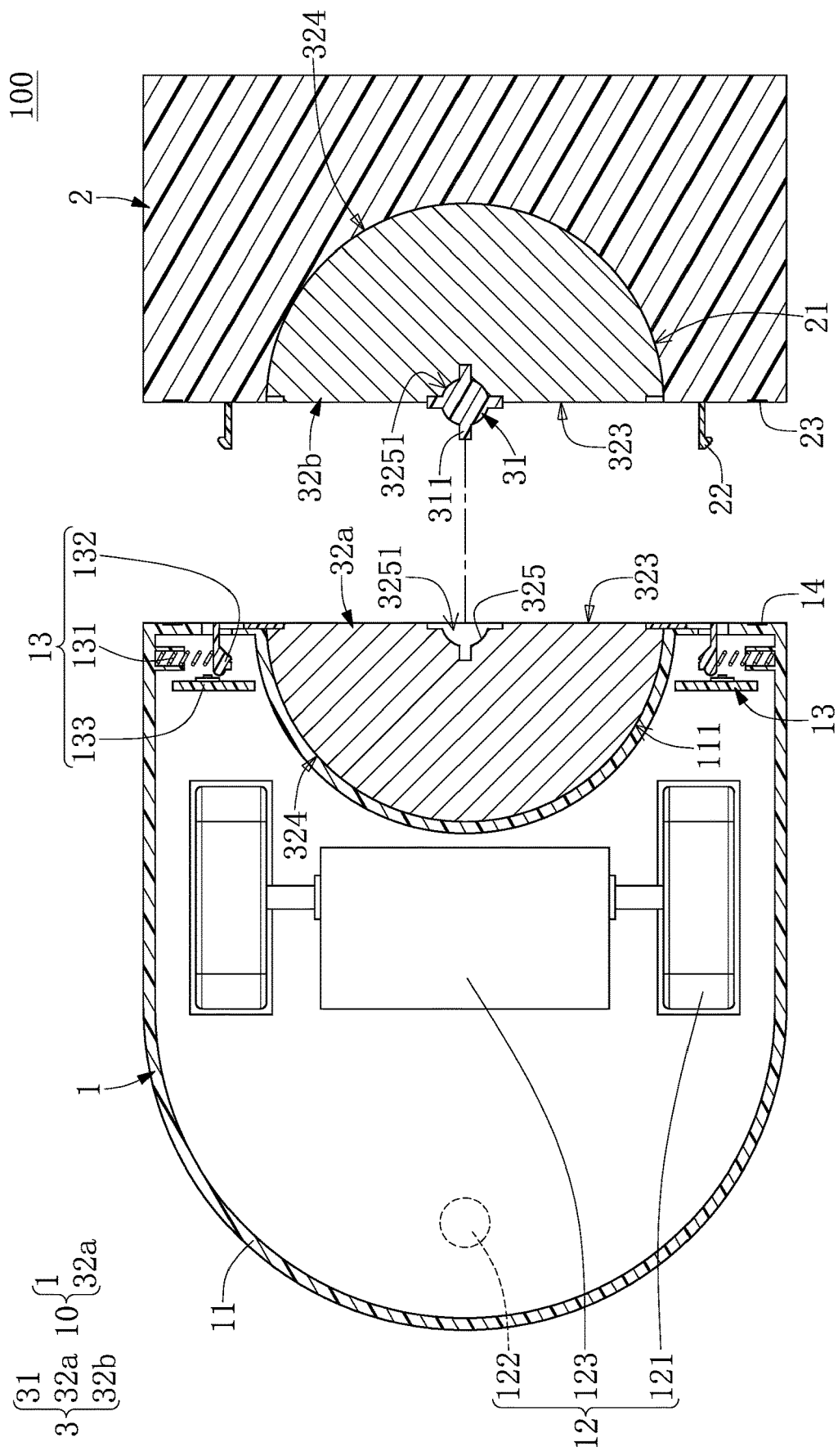
FIG. 6 is a cross-sectional view showing the automatic battery replacement apparatus of FIG. 1 when the moving platform is in a movement operation mode.

As shown in FIG. 4 to FIG. 6, the driving gear 31 is assembled to at least one of the movable carrier 1 and the charging station 2, and is configured to be driven by electricity supplied from the charging station 2. Specifically, the driving gear 31 in the present embodiment is assembled to and electrically coupled to the charging station 2, but the present disclosure is not limited thereto. For example, in other embodiments of the present disclosure, the driving gear 31 can be assembled to the movable carrier 1.

Moreover, the driving gear 31 in the present embodiment is an external gear belonging to the spur gears, but a type of the driving gear 31 can be adjusted or changed according to design requirements and is not limited to the present embodiment. For example, in other embodiments of the present disclosure, the driving gear 31 can be any gear belonging to the bevel gears or the skew gears, or can be any gear belonging to the spur gears other than the external gear.

As the two rechargeable batteries 32a, 32b in the present embodiment are of the substantially same structure, the following description discloses the structure of just one of the two rechargeable batteries 32a, 32b for the sake of brevity, but the present disclosure is not limited thereto. For example, in other embodiments of the present disclosure, the two rechargeable batteries 32a, 32b can be of different structures.

The rechargeable battery 32a or 32b in the present embodiment is a semi-circular plate structure, and an outer surface of the rechargeable battery 32a or 32b includes a top surface 321, a bottom surface 322 opposite to the top surface 321, a connecting side 323 arranged between the top surface 321 and the bottom surface 322, and an outer lateral side 324 that is connected to the connecting side 323 and that is arranged between the top surface 321 and the bottom surface 322.

The top surface 321 and the bottom surface 322 are in the same semi-circular shape, the connecting side 323 is in a substantial straight shape and has a length that is substantially equal to a diameter of the semi-circular shape, and the outer lateral side 324 is in a shape of an arc having a central angle that is substantially equal to 180 degrees, but the present disclosure is not limited thereto. For example, in other embodiments of the present disclosure, the top surface 321 and the bottom surface 322 can be in different shapes and can be in a shape other than the semi-circular shape, the connecting side 323 can be in a shape (e.g., an arced shape or an irregular shape) other than the straight shape, and a central angle of the outer lateral side 324 can be less than 180 degrees. In other words, the central angle of the outer lateral side 324 in the present disclosure can be less than or equal to 180 degrees.

Specifically, the rechargeable battery 32a or 32b has a matching structure 325 configured to be engaged with the driving gear 31. The matching structure 325 is arranged on the connecting side 323. In other words, the matching structure 325 of the rechargeable battery 32a or 32b should be adjusted or changed according to the driving gear 31, so that the matching structure 325 can correspond in shape to a part of the driving gear 31.

In the present embodiment, the matching structure 325 of the rechargeable battery 32a or 32b has an engaging slot 3251 recessed in an outer surface thereof (e.g., the connecting side 323). The engaging slot 3251 is formed on a center of circle of the outer lateral side 324. The engaging slot 3251 corresponds in shape to part of a plurality of teeth 311 of the driving gear 31, so that the rechargeable battery 32a or 32b can be driven to be rotated (along a circular rotation path) by using the engaging slot 3251 to engage with the driving gear 31 (e.g., the part of the teeth 311).

Moreover, the rechargeable battery 32a or 32b has a plurality of electrode pads 326 having different polarities (e.g., a positive pad and a negative pad). The electrode pads 326 of the rechargeable battery 32a or 32b are exposed from the top surface 321 and are preferably arranged adjacent to the connecting side 323. The electrode pads 326 in the present embodiment can be defined as two sets respectively located at two opposite sides of the engaging slot 3251, but the present disclosure is not limited thereto. For example, in other embodiments of the present disclosure, the electrode pads 326 can be exposed from the outer lateral side 324 of the rechargeable battery 32a or 32b; or, the electrode pads 326 can be only one set (e.g., one positive pad and one negative pad).

As shown in FIG. 4 to FIG. 6, the movable carrier 1 can be a robot vacuum or an automatic trolley for transporting objects, but the movable carrier 1 can be changed according to design requirements and is not limited to the present embodiment. The movable carrier 1 includes a carrying body 11, a moving component 12 assembled to the carrying body 11, at least one mechanical locator 13 and at least one optical locator 14 both assembled to (a lateral portion of) the carrying body 11, and a plurality of conductive strips 15 that are assembled in the carrying body 11. In other embodiments of the present disclosure, the mechanical locator 13, the optical locator 14, and the conductive strips 15 can be omitted or replaced by other components.

Specifically, the carrying body 11 has a power supply slot 111 recessed in an outer surface thereof. The power supply slot 111 is formed to accommodate one of the two rechargeable batteries 32a, 32b, but the shape of the power supply slot 111 can be adjusted or changed according to design requirements and is not limited to the drawings of the present embodiment. In the present embodiment, an inner lateral wall of the power supply slot 111 is in a shape of an arc having a central angle that is substantially equal to 180 degrees. However, in other embodiments of the present disclosure, the central angle of the inner lateral wall of the power supply slot 111 can be less than 180 degrees. In other words, the central angle of the inner lateral wall of the power supply slot 111 in the present disclosure can be less than or equal to 180 degrees.

The moving component 12 in the present embodiment includes a plurality of driving wheels 121, a universal wheel 122, and a driver 123 (e.g., a motor) that is configured to rotate the driving wheels 121 and/or the universal wheel 122 to move on a working surface (e.g., a ground). In other words, the movable carrier 1 (or the moving platform 10) can move on the working surface through the moving component 12. However, in other embodiments of the present disclosure, the moving component 12 can be other components (e.g., a roller and a corresponding driver, or a belt and a corresponding driver).

In the movable carrier 1 of the present embodiment, a quantity of the at least one mechanical locator 13 is two, a quantity of the at least one optical locator 14 is two, the two mechanical locators 13 are arranged adjacent to an opening of the power supply slot 111 (e.g., the two mechanical locators 13 are respectively arranged at two opposite sides of the opening of the power supply slot 111), and the two optical locators 14 are respectively arranged adjacent to the two mechanical locators 13. However, the following description discloses the structure of just one of the two mechanical locators 13 and the structure of just one of the two optical locators 14 for the sake of brevity.

Figure 7:
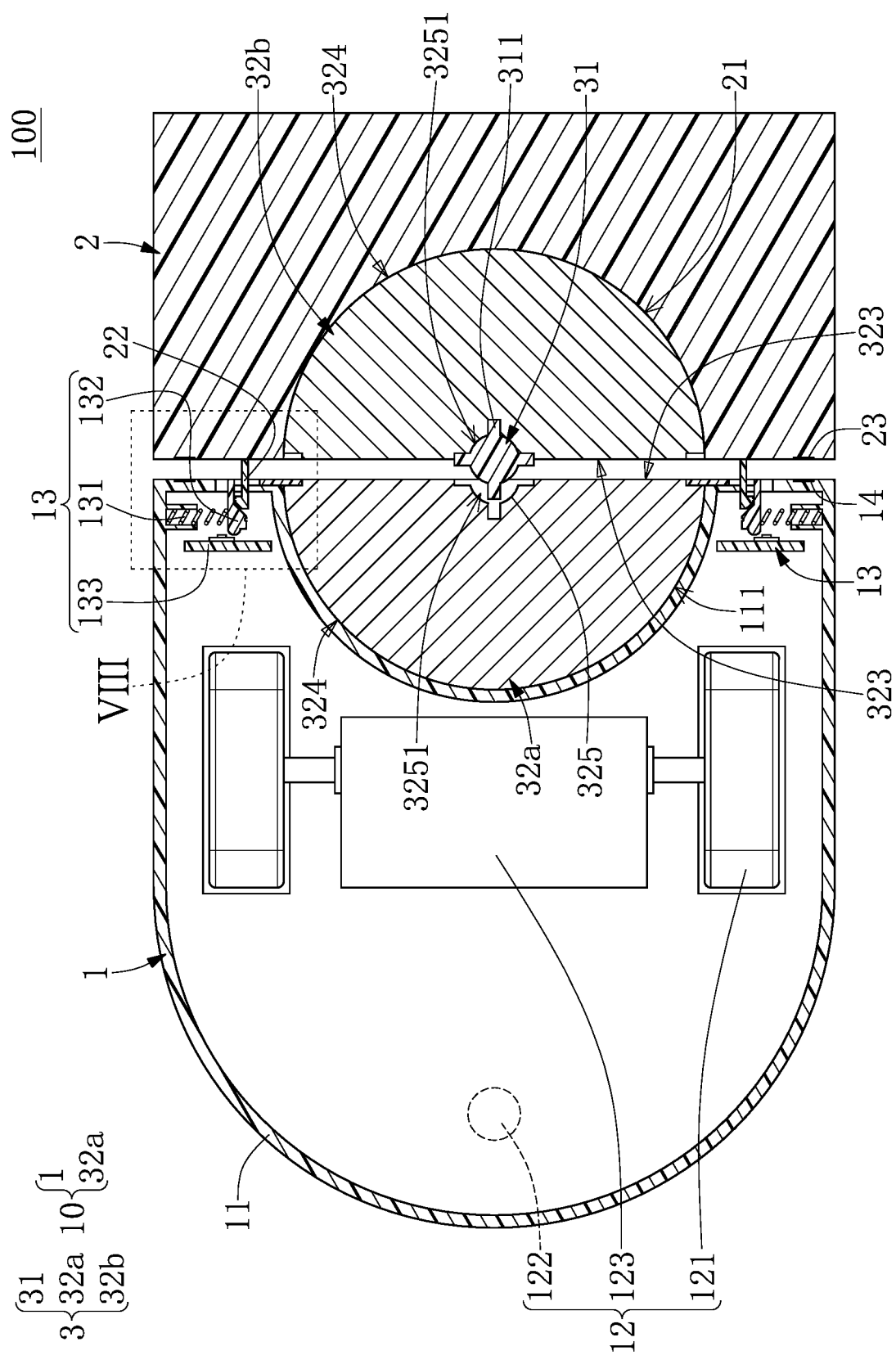
FIG. 7 is a cross-sectional view showing the moving platform of FIG. 6 moves toward the charging station.
Figure 8:
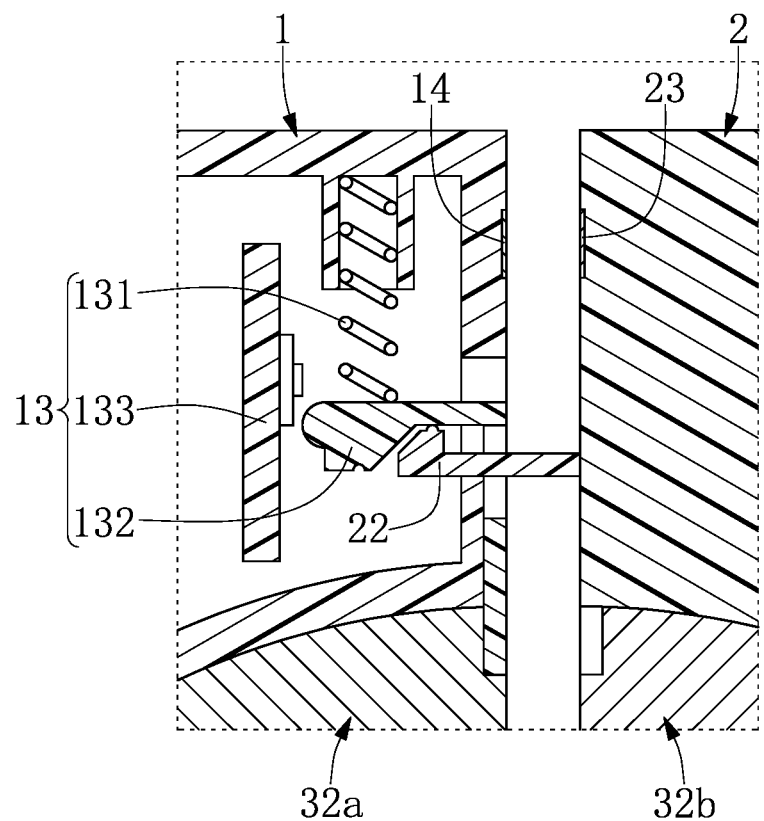
FIG. 8 is an enlarged view showing part VIII of FIG. 7.
Figure 9:
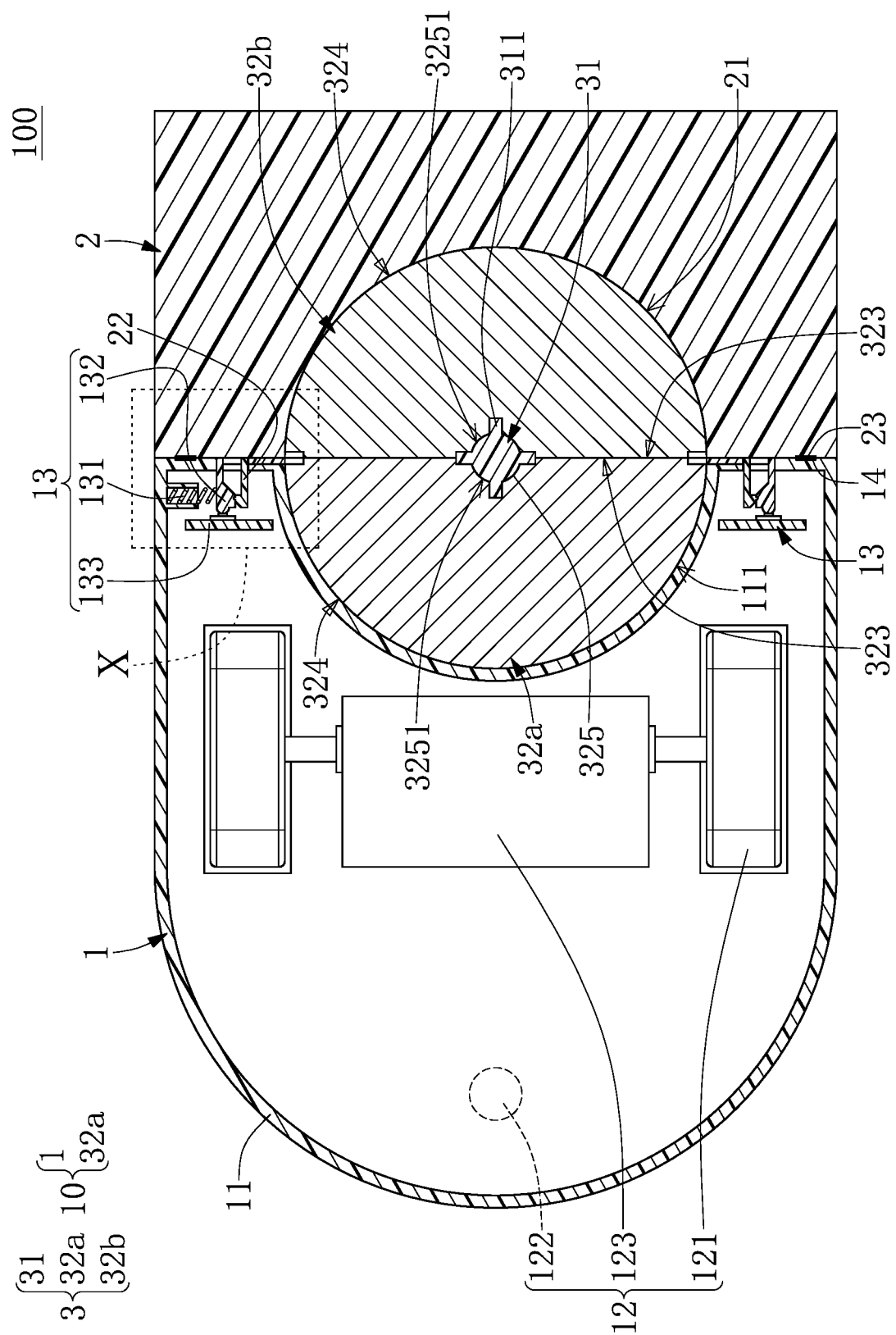
FIG. 9 is a cross-sectional view showing the automatic battery replacement apparatus of FIG. 1 when the moving platform is in a stationary battery replacement mode.
Figure 10:
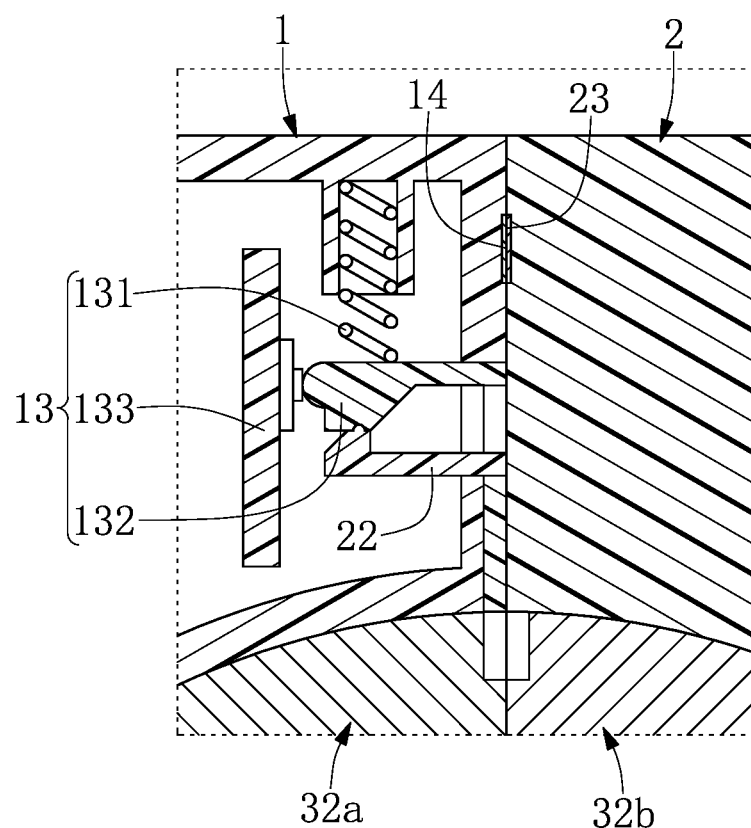
FIG. 10 is an enlarged view showing part X of FIG. 9.

Specifically, as shown in FIG. 6, FIG. 7, and FIG. 9, the mechanical locator 13 includes an elastic component 131 (e.g., a spring) assembled in the carrying body 11, a latch 132 connected to the elastic component 131, and a positioning switch 133 that corresponds in position to the latch 132. The latch 132 is configured with a tendency to be located at an operation position (as shown in FIG. 7 and FIG. 8) to shield a part of the opening through the elastic component 131. The latch 132 is configured to be pressed so as to be moved from the operation position to a battery replacement position (as shown in FIG. 9 and FIG. 10) for not shielding the opening of the power supply slot 111. Moreover, the positioning switch 133 is electrically coupled to the charging station 2, and can be wirelessly connected to the charging station 2.

As shown in FIG. 4 to FIG. 6, the conductive strips 15 have different polarities (e.g., a positive strip and a negative strip). In the present embodiment, the conductive strips 15 are exposed from a top wall of the power supply slot 111, the conductive strips 15 are in a concentric distribution, and each of the conductive strips 15 is in a shape of an arc having a center of circle that is substantially overlapped with the center of circle of the inner lateral wall of the power supply slot 111.

The battery replacement module 3 and the movable carrier 1 are disclosed in the above description, and one of the two rechargeable batteries 32a, 32b is assembled in the power supply slot 111 for supplying electricity to the movable carrier 1. The following description describes the cooperation between the movable carrier 1 and the rechargeable battery 32a assembled therein (i.e., the moving platform 10).

The mechanical locator 13 and the inner lateral wall of the power supply slot 111 of the movable carrier 1 jointly hold the rechargeable battery 32a in position in the movable carrier 1. In the present embodiment, the movable carrier 1 is provided to use the latch 132 at the operation position and the inner lateral wall of the power supply slot 111 for jointly holding the rechargeable battery 32a, and the electrode pads 326 of the rechargeable battery 32a respectively abut against the conductive strips 15.

Moreover, as shown in FIG. 4, FIG. 5, and FIG. 9, when the latch 132 is at the battery replacement position, the rechargeable battery 32a can be rotated along the inner lateral wall of the power supply slot 111 by having the matching structure 325 be engaged with the driving gear 31, and the conductive strips 15 remain respectively abutted against the electrode pads 326 of the rechargeable battery 32a.

The cooperation between the movable carrier 1 and the rechargeable battery 32a assembled therein has been disclosed in the above description, and the following description describes the charging station 2 and the connection relationship between the charging station 2 and the other components.

As shown in FIG. 5 and FIG. 6, the charging station 2 is configured to be located at a predetermined position. The charging station 2 in the present embodiment is electrically coupled to a mains socket (not shown in the drawings), thereby obtaining electricity from the mains socket. Specifically, the charging station 2 has a charging slot 21 recessed in an outer surface thereof, and an inner lateral wall of the charging slot 21 is in a shape of an arc having a central angle that is substantially equal to 180 degrees. The charging slot 21 is formed to accommodate one of the two rechargeable batteries 32a, 32b, further, the shape of the charging slot 21 can be adjusted or changed according to design requirements and is not limited to the drawings of the present embodiment. For example, in other embodiments of the present disclosure, the central angle of the inner lateral wall of the charging slot 21 can be less than 180 degrees. In other words, the central angle of the inner lateral wall of the charging slot 21 in the present disclosure can be less than or equal to 180 degrees.

Moreover, the charging station 2 includes at least one optical locator 23 and at least one mechanical locator 22. The functions and the positions of the at least one optical locator 23 and the at least one mechanical locator 22 of the charging station 2 respectively correspond to those of the at least one optical locator 14 and the at least one mechanical locator 13 of the movable carrier 1. In the charging station 2 of the present embodiment, a quantity of the at least one mechanical locator 22 is two, a quantity of the at least one optical locator 23 is two, the two mechanical locators 22 are arranged adjacent to an opening of the charging slot 21 (e.g., the two mechanical locators 22 are respectively arranged at two opposite sides of the opening of the charging slot 21), and the two optical locators 23 are respectively arranged adjacent to the two mechanical locators 22. However, the following description discloses the structure of just one of the two mechanical locators 22 and the structure of just one of the two optical locators 23 for the sake of brevity.

Moreover, the driving gear 31 in the present embodiment is assembled to the charging station 2 and is located in the opening of the charging slot 21 (e.g., a center of circle of the inner lateral wall of the charging slot 21), so that the driving gear 31 and the inner lateral wall of the charging slot 21 can jointly hold the rechargeable battery 32b in position in the charging station 2. In addition, the driving gear 31 is preferable to be detachably or movably arranged in the opening of the charging slot 21, so that the driving gear 31 can be moved away from the opening of the charging slot 21 according to practical requirements.

Specifically, the charging station 2 includes a driving mechanism (not shown in the drawings) for rotating the driving gear 31. For example, the driving mechanism can be a motor and a transmission gear assembly that is connected to the motor, so that the motor can be used to drive the driving gear 31 to rotate through the transmission gear assembly, but the present disclosure is not limited thereto. In other embodiments of the present disclosure, the connection relationship between the driving mechanism and the driving gear 31 can be implemented by other structures (e.g., the motor is used to directly rotate the driving gear 31).

In the present embodiment, the charging station 2 further includes a plurality of conductive strips 24 having different polarities (e.g., a positive strip and a negative strip). Moreover, the conductive strips 24 are exposed from a top wall of the charging slot 21, the conductive strips 24 are in a concentric distribution, and each of the conductive strips 24 is in a shape of an arc having a center of circle that is substantially overlapped with the center of circle of the inner lateral wall of the charging slot 111.

Furthermore, the electrode pads 326 of the rechargeable battery 32b respectively abut against the conductive strips 24, so that the rechargeable battery 32b can obtain electricity from the mains socket by the conductive strips 24 of the charging slot 21, but the present disclosure is not limited thereto. For example, in other embodiments of the present disclosure, the charging station 2 can include a plurality of charging pads respectively corresponding in position to the electrode pads 326 of the rechargeable battery 32b, so that the charging station 2 can be used to charge the rechargeable battery 32b by using the charging pads to respectively contact the electrode pads 326.

Figure 11:
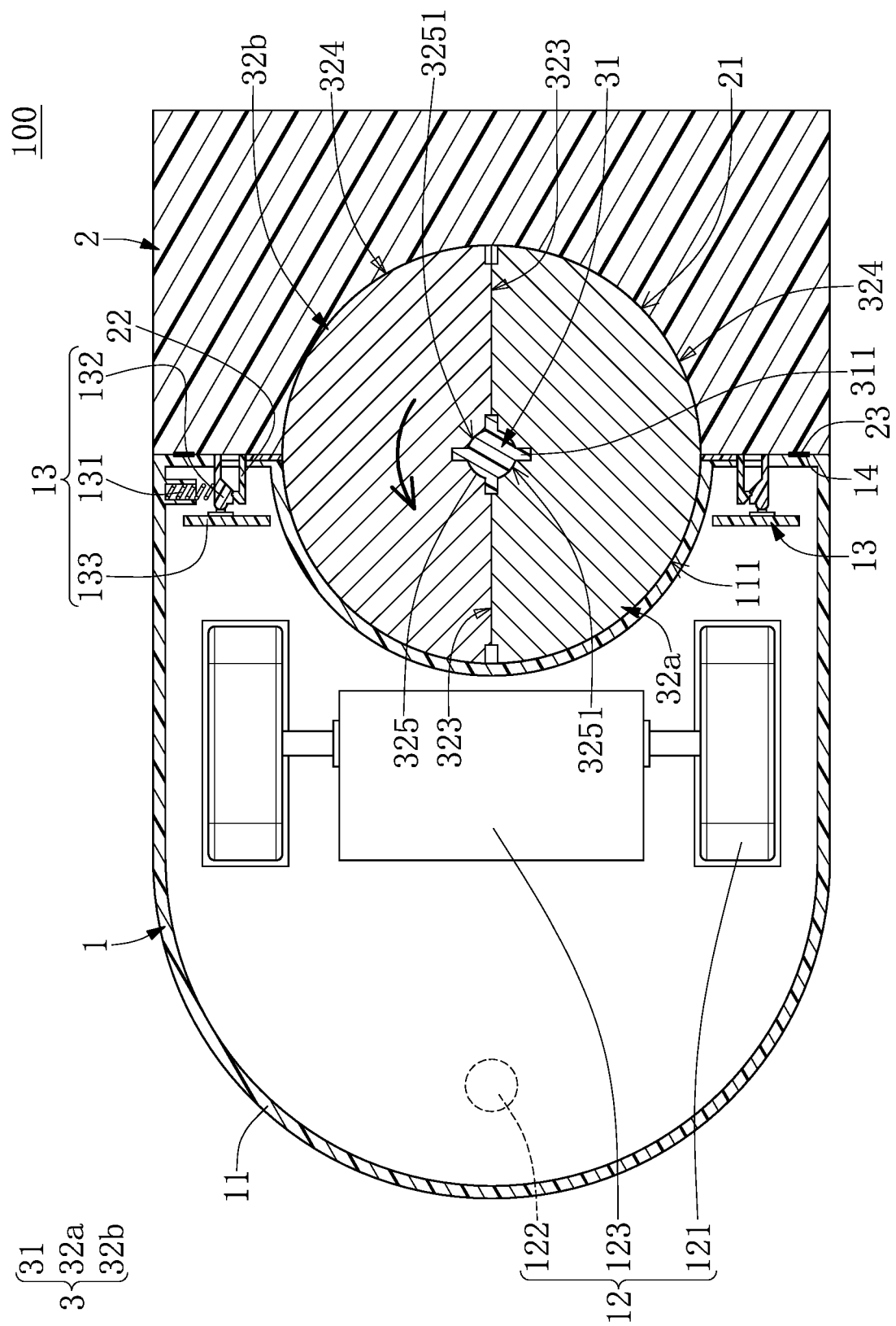
FIG. 11 is a cross-sectional view showing the automatic battery replacement apparatus of FIG. 1 when the moving platform is in the stationary battery replacement mode and when a driving gear is operated.

The structure of the automatic battery replacement apparatus 100 has been disclosed in the above description, and the following description describes the operation of the automatic battery replacement apparatus 100. The moving platform 10 is configured to be in a movement operation mode (as shown in FIG. 6 to FIG. 8) where the moving platform 10 is capable of motion relative to the charging station 2, or a stationary battery replacement mode (as shown in FIG. 9 to FIG. 11) where the moving platform 10 is stationary relative to the charging station 2. When the moving platform 10 is in the movement operation mode, the moving platform 10 can perform its own operations (e.g., the robot vacuum performs a sweeping operation; or the automatic trolley performs a transportation operation). Moreover, when the electricity of the rechargeable battery 32a of the moving platform 10 is reduced and close to a predetermined charging threshold, the moving platform 10 can move toward the charging station 2.

Specifically, as shown in FIG. 6 to FIG. 8, the moving platform 10 is configured to move toward the charging station 2 through the cooperation of the two optical locators 14, 23. When the moving platform 10 moves toward the charging station 2, the two mechanical locators 13, 22 of the movable carrier 1 and the charging station 2 are configured to be connected with each other (e.g., the latch 132 is pressed by the mechanical locator 22 of the charging station 2 so as to be moved from the operation position to the battery replacement position for not shielding the corresponding opening) to allow the moving platform 10 to be in the stationary battery replacement mode. In addition, the latch 132 can be connected to the mechanical locator 22 (e.g., the latch 132 and the mechanical locator 22 can be engaged with each other through cooperation between a bump and a concavity thereof), thereby preventing the movable carrier 1 and the charging station 2 from separating from each other.

As shown in FIG. 9 to FIG. 11, when the latch 132 is at the battery replacement position, the latch 132 contacts the positioning switch 133 so as to allow the positioning switch 133 to emit a start signal to the charging station 2 for rotating the driving gear 31, but the present disclosure is not limited thereto. For example, in other embodiments of the present disclosure, the charging station 2 can be used to rotate the driving gear 31 by receiving signals emitted from other components, so that the positioning switch 133 can be omitted or can be replaced by other components.

Specifically, when the moving platform 10 is in the stationary battery replacement mode, the center of circle of the inner lateral wall of the power supply slot 111 is overlapped with the center of circle of the inner lateral wall of the charging slot 21 and defines a rotation axis, and the driving gear 31 is engaged with the matching structure 325 of each of the two rechargeable batteries 32a, 32b so as to rotate the rechargeable batteries 32a, 32b along the rotation axis until positions of the two rechargeable batteries 32a, 32b are interchanged with each other.

In the present embodiment, when the moving platform 10 is in the stationary battery replacement mode, the engaging slots 3251 of the two rechargeable batteries 32a, 32b are respectively engaged with two opposite sides of the driving gear 31 (e.g., the engaging slots 3251 of the two rechargeable batteries 32a, 32b are engaged with all of the teeth 311 of the driving gear 31), so that the driving gear 31 can synchronously rotate the two rechargeable batteries 32a, 32b. However, in other embodiments of the present disclosure, the driving gear 31 can be engaged with the engaging slot 3251 of only one of the two rechargeable batteries 32a, 32b so as to rotate the engaged rechargeable battery 32a or 32b along the rotation axis until positions of the two rechargeable batteries 32a, 32b are interchanged with each other.

Moreover, when the moving platform 10 is in the stationary battery replacement mode, the conductive strips 15 remain respectively abutted against the electrode pads 326 of at least one of the two rechargeable batteries 32a, 32b (as shown in FIG. 4 and FIG. 5), so that the movable carrier 1 can be electrically coupled to at least one of the two rechargeable batteries 32a, 32b for establishing an uninterruptible power function. In addition, the movable carrier 1 in the present embodiment can be electrically coupled to the charging station 2 through the two mechanical locators 13, 22 connected with each other, so that the moving platform 10 in the stationary battery replacement mode can obtain electricity from the charging station 2.

Second Embodiment

Figure 12:
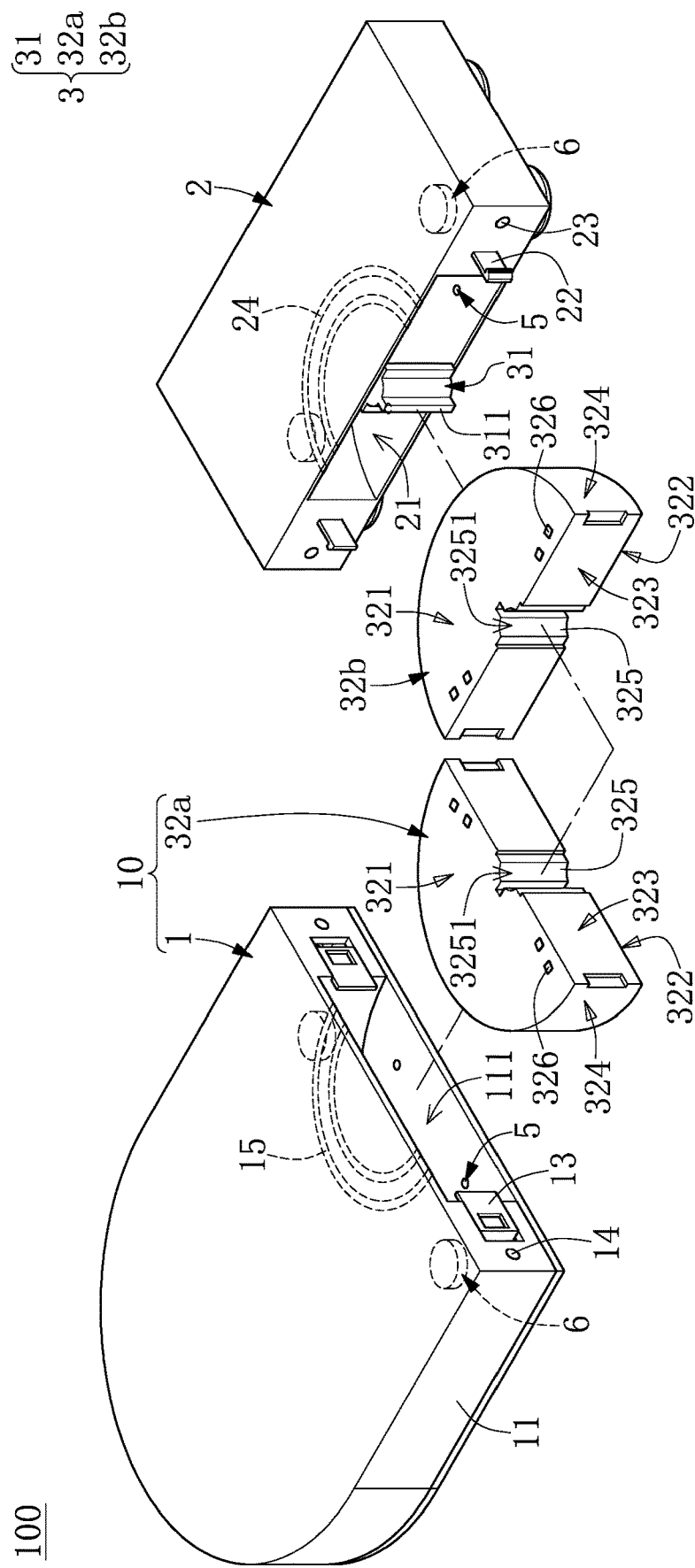
FIG. 12 is an exploded view of an automatic battery replacement apparatus according to a second embodiment of the present disclosure.
Figure 13:
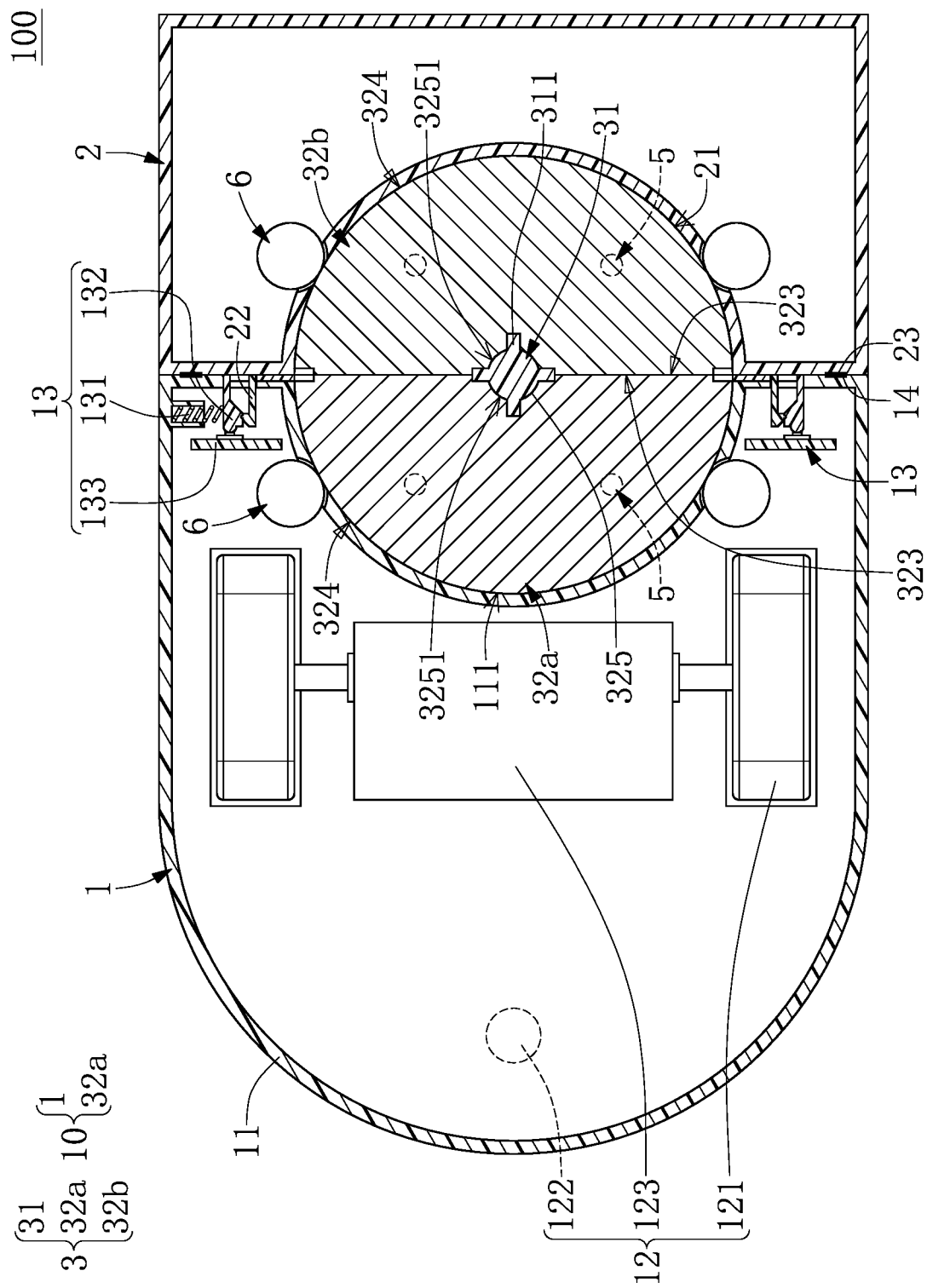
FIG. 13 is a cross-sectional view showing the automatic battery replacement apparatus according to the second embodiment of the present disclosure.

Referring to FIG. 12 and FIG. 13, a second embodiment of the present disclosure is similar to the first embodiment of the present disclosure. For the sake of brevity, descriptions of the same components in the first and second embodiments of the present disclosure will be omitted herein, and the following description only discloses different features between the first and second embodiments.

In the present embodiment, the automatic battery replacement apparatus 100 further includes a plurality of side auxiliary wheels 5 and a plurality of forward auxiliary wheels 6. The side auxiliary wheels 5 are respectively arranged in the moving platform 10 between the inner lateral wall of the power supply slot 111 and the rechargeable battery 32a and in the charging station 2 between the inner lateral wall of the charging slot 21 and the rechargeable battery 32b. Moreover, the forward auxiliary wheels 6 are respectively arranged in the moving platform 10 between a bottom wall of the power supply slot 111 and the rechargeable battery 32a and in the charging station 2 between a bottom wall of the charging slot 21 and the rechargeable battery 32b.

It should be noted that the side auxiliary wheels 5 and the forward auxiliary wheels 6 in the present embodiment are rotated only by rubbing with the two rechargeable batteries 32a, 32b, and cannot be rotated or driven by other components. In other words, any roller driven by a component other than a rechargeable battery is different from the side auxiliary wheel 5 or the forward auxiliary wheel 6 of the present embodiment.

Accordingly, when the moving platform 10 is in the stationary battery replacement mode, the two rechargeable batteries 32a, 32b can be smoothly rotated along the inner lateral wall and the bottom wall of the power supply slot 111 and the inner lateral wall and the bottom wall of the charging slot 21 through the side auxiliary wheels 5 and the forward auxiliary wheels 6, but the present disclosure is not limited thereto. For example, in other embodiments of the present disclosure, the side auxiliary wheels 5 or the forward auxiliary wheels 6 in the automatic battery replacement apparatus 100 can be omitted.

Third Embodiment

Figure 14:
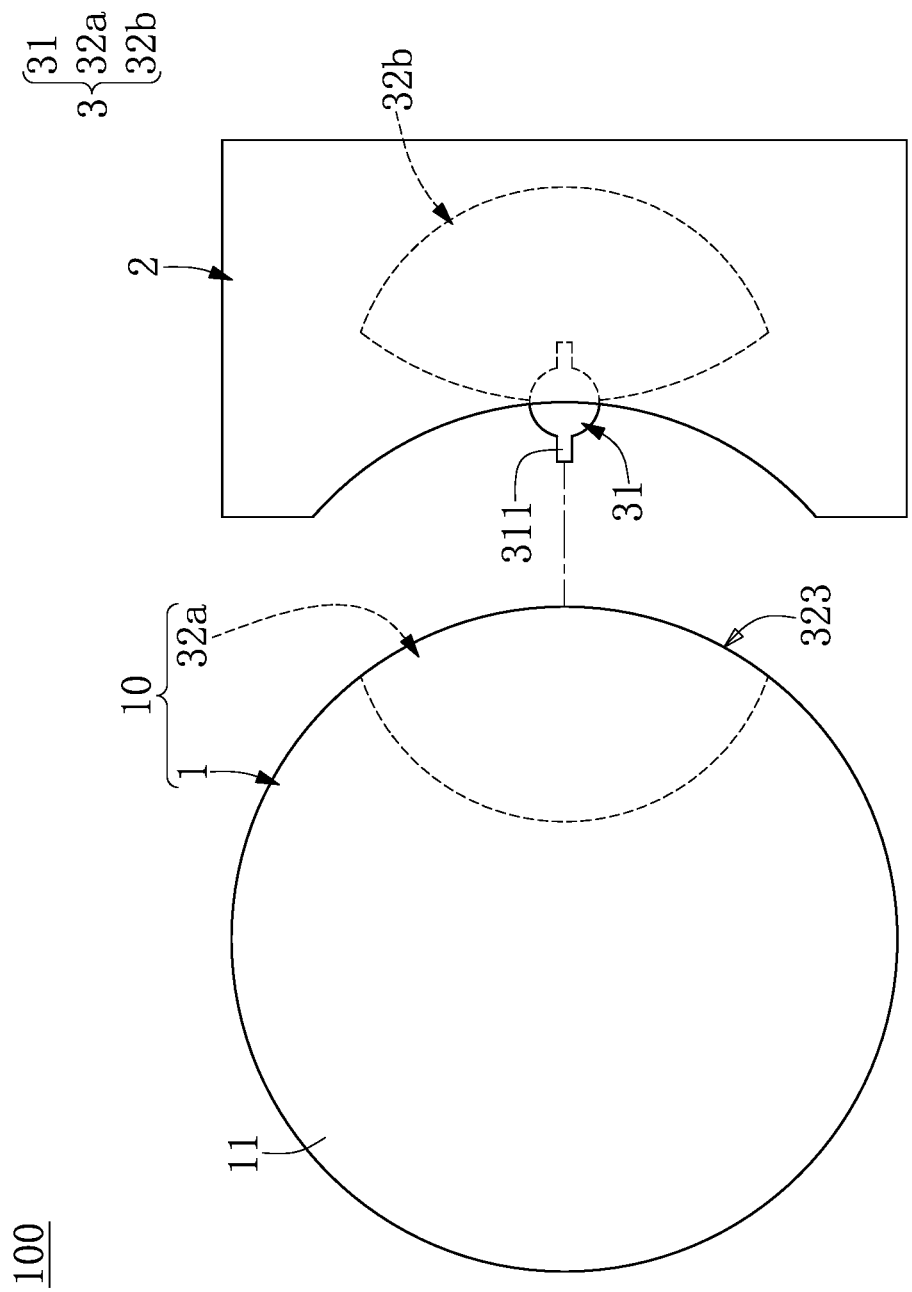
FIG. 14 is a planar view of an automatic battery replacement apparatus according to a third embodiment of the present disclosure.

Referring to FIG. 14, a third embodiment of the present disclosure is similar to the first and second embodiments of the present disclosure. For the sake of brevity, descriptions of the same components in the first to third embodiments of the present disclosure will be omitted herein, and the following description only discloses different features between the third embodiment and the first and second embodiments.

In the present embodiment, the connecting side 323 of each of the two rechargeable batteries 32a, 32b can be in a shape of an arc, and the connecting side 323 of the rechargeable battery 32a is flush with the outer surface of the carrying body 11 adjacent thereto, so that the moving platform 10 can be substantially in a circular shape. Moreover, the movable carrier 1 and the charging station 2 can be adjusted according to the connecting side 323 of each of the two rechargeable batteries 32a, 32b and the design requirements.

Fourth Embodiment

Figure 15:
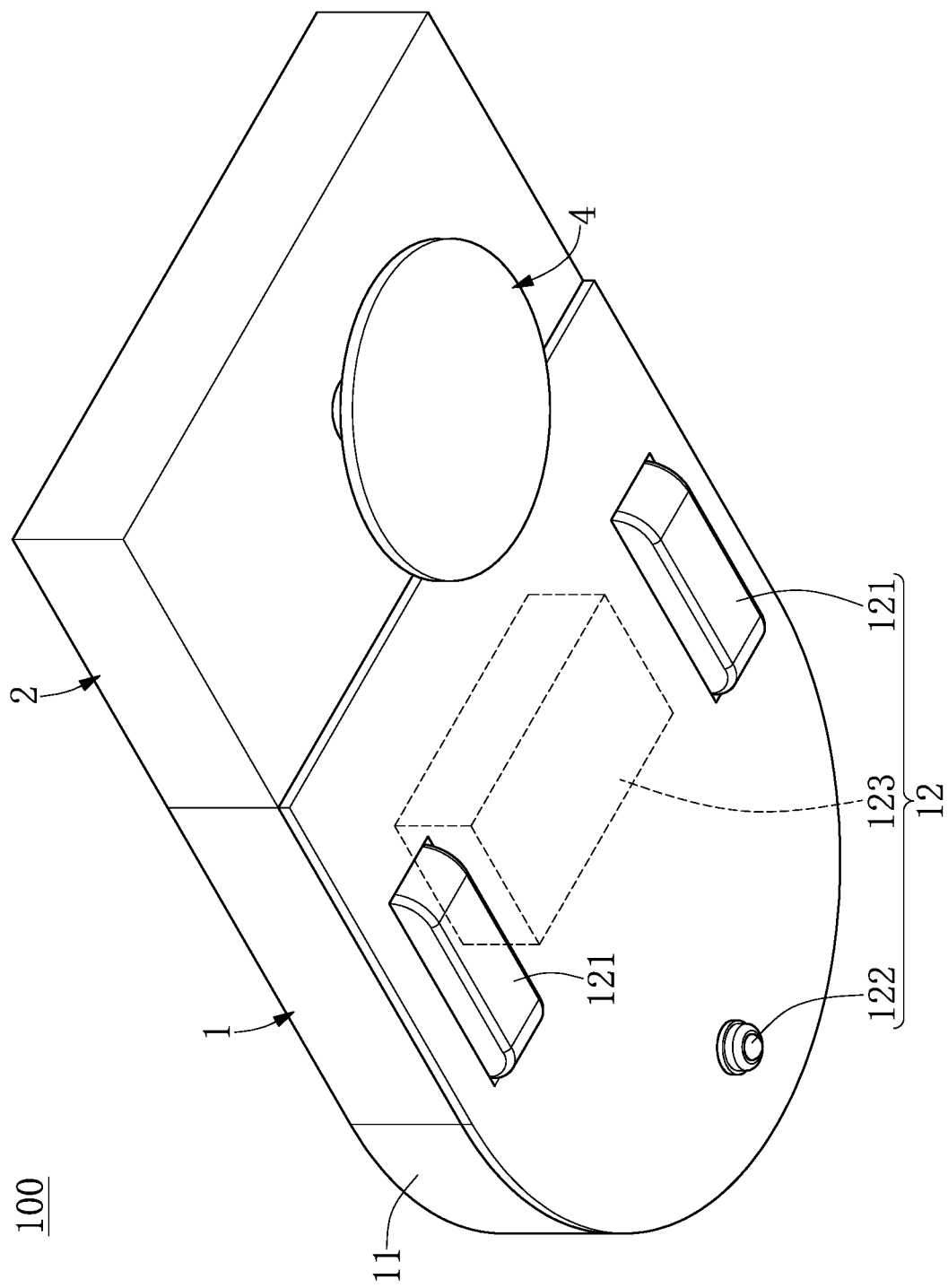
FIG. 15 is a perspective view of an automatic battery replacement apparatus according to a fourth embodiment of the present disclosure.

Referring to FIG. 15, a fourth embodiment of the present disclosure is similar to the first to third embodiments of the present disclosure. For the sake of brevity, descriptions of the same components in the first to fourth embodiments of the present disclosure will be omitted herein, and the following description only discloses different features between the fourth embodiment and the first to third embodiments.

In the present embodiment, the automatic battery replacement apparatus 100 further includes an aligning structure 4 assembled to the charging station 2. The charging station 2 in the present embodiment is configured to be located at the predetermined position through the aligning structure 4, so that the charging station 2 can be swingable through the aligning structure 4. The charging station 2 in the present embodiment is electrically coupled to a mains socket (not shown in the drawings), thereby obtaining electricity from the mains socket.

Specifically, when the moving platform 10 moves toward and contacts the charging station 2, the charging station 2 is swung through the aligning structure 4 so as to allow the moving platform 10 to be in the stationary battery replacement mode. In other words, when the positions of the moving platform 10 and the charging station 2 have a slight deviation, the charging station 2 can be swung through the aligning structure 4 to eliminate the slight deviation, so that the moving platform 10 can be precisely aligned with the charging station 2.

Beneficial Effects of the Embodiments

In conclusion, the automatic battery replacement apparatus of the present disclosure is provided for automatic replacing the rechargeable batteries through the structural designs of the rechargeable battery and other components (e.g., the driving gear, the movable carrier, and/or the charging station).

Moreover, when the moving platform of the present disclosure moves toward the charging station, the moving platform can be precisely aligned with the charging station through the specific structural designs (e.g., the mechanical locators used in cooperation with each other, the optical locators used in cooperation with each other, or the aligning structure).

In addition, when the moving platform is in the stationary battery replacement mode, the automatic battery replacement apparatus of the present disclosure can provide the uninterruptible power function through the specific structural designs (e.g., the cooperation between the conductive strips of the movable carrier and the electrode pads of the two rechargeable batteries; or the electrical connection between the moving platform and the charging station, which is established by the connection between the two mechanical locators).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An automatic battery replacement apparatus, comprising:
   a movable carrier including:
      a carrying body having a power supply slot recessed in an outer surface thereof, wherein an inner lateral wall of the power supply slot is in a shape of an arc having a central angle that is less than or equal to 180 degrees; and
      a moving component assembled to the carrying body and configured to move on a working surface;
   a charging station configured to be located at a predetermined position, wherein the charging station has a charging slot recessed in an outer surface thereof, and an inner lateral wall of the charging slot is in a shape of an arc having a central angle that is less than or equal to 180 degrees; and
   a battery replacement module including:
      a driving gear assembled to at least one of the movable carrier and the charging station and configured to be driven by electricity supplied from the charging station; and
      two rechargeable batteries each having a matching structure that is configured to be engaged with the driving gear, wherein one of the two rechargeable batteries is assembled in the power supply slot for supplying electricity to the movable carrier, and another one of the two rechargeable batteries is assembled in the charging slot, and wherein the movable carrier and the rechargeable battery assembled therein are jointly defined as a moving platform, and the moving platform is configured to be in a movement operation mode where the moving platform is capable of motion relative to the charging station, or a stationary battery replacement mode where the moving platform is stationary relative to the charging station;
   wherein, when the moving platform is in the stationary battery replacement mode, a center of circle of the inner lateral wall of the power supply slot is overlapped with a center of circle of the inner lateral wall of the charging slot and defines a rotation axis, and the driving gear is engaged with the matching structure of at least one of the two rechargeable batteries so as to rotate the rechargeable batteries along the rotation axis until positions of the two rechargeable batteries are interchanged with each other.

2. The automatic battery replacement apparatus according to claim 1, wherein the matching structure of each of the two rechargeable batteries has an engaging slot recessed in an outer surface thereof, and each of the engaging slots corresponds in shape to part of a plurality of teeth of the driving gear, so that any one of the two rechargeable batteries is configured to be rotated by using the engaging slot to engage with the driving gear.

3. The automatic battery replacement apparatus according to claim 2, wherein the moving platform is in the stationary battery replacement mode, the driving gear is located at the center of circle of the inner lateral wall of any one of the power supply slot and the charging slot, and the engaging slots of the two rechargeable batteries are respectively engaged with two opposite sides of the driving gear, so that the driving gear is configured to synchronously rotate the two rechargeable batteries.

4. The automatic battery replacement apparatus according to claim 3, wherein the driving gear is assembled to and electrically coupled to the charging station, and the driving gear and the inner lateral wall of the charging slot jointly hold one of the two rechargeable batteries in position in the charging station.

5. The automatic battery replacement apparatus according to claim 1, further comprising an aligning structure, wherein the charging station is configured to be located at the predetermined position through the aligning structure, and wherein, when the moving platform moves toward and contacts the charging station, the charging station is swung through the aligning structure so as to allow the moving platform to be in the stationary battery replacement mode.

6. The automatic battery replacement apparatus according to claim 1, wherein each of the movable carrier and the charging station has an optical locator, and the moving platform is configured to move toward the charging station through the cooperation of the two optical locators.

7. The automatic battery replacement apparatus according to claim 1, wherein each of the movable carrier and the charging station has a mechanical locator, and wherein, when the moving platform moves toward the charging station, the two mechanical locators of the movable carrier and the charging station are configured to be connected with each other so as to allow the moving platform to be in the stationary battery replacement mode.

8. The automatic battery replacement apparatus according to claim 7, wherein the mechanical locator of the movable carrier is arranged adjacent to an opening of the power supply slot, and the mechanical locator and the inner lateral wall of the power supply slot of the movable carrier jointly hold one of the two rechargeable batteries in position in the movable carrier.

9. The automatic battery replacement apparatus according to claim 8, wherein the mechanical locator of the movable carrier includes:
an elastic component assembled in the carrying body; and
a latch connected to the elastic component, wherein the latch is configured with a tendency to be located at an operation position to shield a part of the opening through the elastic component, so that the latch at the operation position and the inner lateral wall of the power supply slot jointly hold one of the two rechargeable batteries in position in the movable carrier;
wherein, when the moving platform moves toward the charging station, the latch is configured to be pressed by the mechanical locator of the charging station so as to be moved from the operation position to a battery replacement position for not shielding the opening.

10. The automatic battery replacement apparatus according to claim 9, wherein the mechanical locator of the movable carrier includes a positioning switch corresponding in position to the latch and electrically coupled to the charging station, and wherein, when the latch is at the battery replacement position, the latch contacts the positioning switch so as to allow the positioning switch to emit a start signal to the charging station for rotating the driving gear.

11. The automatic battery replacement apparatus according to claim 7, wherein the movable carrier is electrically coupled to the charging station through the two mechanical locators connected with each other, and the moving platform in the stationary battery replacement mode is configured to obtain electricity from the charging station.

12. The automatic battery replacement apparatus according to claim 1, wherein the movable carrier includes a plurality of conductive strips arranged in the carrying body, each of the two rechargeable batteries has a plurality of electrode pads, and the electrode pads of the rechargeable battery assembled in the movable carrier respectively abut against the conductive strips, and wherein, when the moving platform is in the stationary battery replacement mode, the conductive strips remain respectively abutted against the electrode pads of at least one of the two rechargeable batteries.

13. The automatic battery replacement apparatus according to claim 12, wherein each of the conductive strips is in a shape of an arc having a center of circle that is overlapped with the center of circle of the power supply slot, and the conductive strips are in a concentric distribution.

14. A moving platform, comprising:
a movable carrier including:
a carrying body having a power supply slot recessed in an outer surface thereof, wherein an inner lateral wall of the power supply slot is in a shape of an arc having a central angle that is less than or equal to 180 degrees; and
a moving component assembled to the carrying body and configured to move on a working surface; and
a rechargeable battery assembled in the power supply slot for supplying electricity to the movable carrier, wherein the rechargeable battery has a matching structure configured to be engaged with a driving gear, and wherein the rechargeable battery is configured to be rotated along the inner lateral wall of the power supply slot by having the matching structure engaged with the driving gear.

15. The moving platform according to claim 14, wherein an outer lateral side of the rechargeable battery is in a shape of an arc having a central angle that is less than or equal to 180 degrees, the matching structure of the rechargeable battery has an engaging slot recessed in an outer surface thereof, and the engaging slot is configured to engage with part of a plurality of teeth of the driving gear.

16. The moving platform according to claim 14, wherein the movable carrier has a mechanical locator arranged adjacent to an opening of the power supply slot, and the mechanical locator and the inner lateral wall of the power supply slot jointly hold the rechargeable battery in position in the movable carrier.

17. The moving platform according to claim 16, wherein the mechanical locator of the movable carrier includes:
an elastic component assembled in the carrying body; and
a latch connected to the elastic component, wherein the latch is configured with a tendency to be located at an operation position to shield a part of the opening through the elastic component, so that the latch at the operation position and the inner lateral wall of the power supply slot jointly hold the rechargeable battery in position in the movable carrier;
wherein the latch is configured to be pressed so as to be moved from the operation position to a battery replacement position for not shielding the opening.

18. The moving platform according to claim 14, wherein the movable carrier includes a plurality of conductive strips arranged in the carrying body, the rechargeable battery has a plurality of electrode pads that respectively abut against the conductive strips, and wherein, when the rechargeable battery rotates along the inner lateral wall of the power supply slot, the conductive strips remain respectively abutted against the electrode pads of the rechargeable battery.

19. The moving platform according to claim 18, wherein each of the conductive strips is in a shape of an arc having a center of circle that is overlapped with the center of circle of the power supply slot, and the conductive strips are in a concentric distribution.

20. A rechargeable battery for being assembled in a movable carrier or a charging station, the rechargeable battery comprising:
an outer lateral side being in a shape of an arc having a central angle that is less than or equal to 180 degrees; and
an engaging slot formed on a center of circle of the outer lateral side, wherein the engaging slot is configured to engage with part of a plurality of teeth of a driving gear;
wherein the rechargeable battery is configured to be rotated along a circular rotation path by using the engaging slot to be engaged with the driving gear.

* * * * *